US012728579B2

(12) United States Patent
Yan et al.

(10) Patent No.: US 12,728,579 B2
(45) Date of Patent: Sep. 8, 2026

(54) CRYSTALLINE AND EASILY RECYCLABLE POLYESTER HEAT SHRINKABLE FILM AND PREPARATION METHOD THEREOF

(71) Applicant: Henan Yinjinda New Materials Co., Ltd., Xinxiang City (CN)

(72) Inventors: Yinfeng Yan, Xinxiang City (CN); Yuanhong Li, Xinxiang City (CN); Qigang Zhang, Xinxiang City (CN); Yuechao Zhao, Xinxiang City (CN); Weiwei Wang, Xinxiang City (CN); Pengpeng Fan, Xinxiang City (CN); Wenbin Cai, Xinxiang City (CN); Shujuan Gao, Xinxiang City (CN); Wenqing Fu, Xinxiang City (CN); Yang Li, Xinxiang City (CN)

( * ) Notice: Subject to any disclaimer, the term of this patent is extended or adjusted under 35 U.S.C. 154(b) by 0 days.

(21) Appl. No.: 19/028,244

(22) Filed: Jan. 17, 2025

(65) Prior Publication Data

US 2025/0153413 A1 May 15, 2025

Related U.S. Application Data

(63) Continuation of application No. PCT/CN2024/120082, filed on Sep. 20, 2024.

(30) Foreign Application Priority Data

Oct. 10, 2023 (CN) ........................ 202311300538.X

(51) Int. Cl.
*B29C 48/21* (2019.01)
*B29C 48/00* (2019.01)
(Continued)

(52) U.S. Cl.
CPC .......... *B29C 48/21* (2019.02); *B29C 48/0018* (2019.02); *B29C 48/28* (2019.02);
(Continued)

(58) Field of Classification Search
CPC ..... B29C 48/0018; B29C 48/08; B29C 48/21; B29C 48/28; B29C 48/91; B29C 48/9145;
(Continued)

(56) References Cited

U.S. PATENT DOCUMENTS

2022/0389214 A1* 12/2022 Lee ...................... C08G 63/199
2023/0128818 A1* 4/2023 Peters ................. C08G 63/199 525/444

FOREIGN PATENT DOCUMENTS

CN 114514286 A 5/2022
CN 115698127 A 2/2023
(Continued)

OTHER PUBLICATIONS

Translation of CN 115742517, Wu et al., Mar. 7, 2023. (Year: 2023).*
(Continued)

*Primary Examiner* — Hai Vo

(57) ABSTRACT

Provided are a crystalline and easily recyclable polyester heat shrinkable film, having a three-layer structure of layer A/layer B/layer C, in which the layer A is prepared by raw materials consisting of polyethylene terephthalate glycol copolymer (PETG), a functional master batch and polyethylene terephthalate (PET), the layer B is prepared by raw materials consisting of a modified PET, PET, a nucleating agent, a chain extender, and a foaming agent.

5 Claims, 1 Drawing Sheet

(51) Int. Cl.

| | |
|---|---|
| ***B29C 48/28*** | (2019.01) |
| ***B29C 48/88*** | (2019.01) |
| ***B29C 48/91*** | (2019.01) |
| ***B29K 67/00*** | (2006.01) |
| ***B29K 105/00*** | (2006.01) |
| ***B29K 105/02*** | (2006.01) |
| ***B32B 27/06*** | (2006.01) |
| ***B32B 27/18*** | (2006.01) |
| ***B32B 27/36*** | (2006.01) |

(52) U.S. Cl.
CPC .......... *B29C 48/91* (2019.02); *B29C 48/9145* (2019.02); *B32B 27/065* (2013.01); *B32B 27/18* (2013.01); *B32B 27/36* (2013.01); *B29K 2067/003* (2013.01); *B29K 2105/0085* (2013.01); *B29K 2105/02* (2013.01); *B29K 2995/0059* (2013.01); *B29K 2995/0097* (2013.01); *B32B 2266/0264* (2013.01); *B32B 2272/00* (2013.01); *B32B 2307/736* (2013.01)

(58) Field of Classification Search
CPC .............. B29C 48/92; B29K 2067/003; B29K 2105/0085; B29K 2105/02; B29K 2995/0059; B29K 2995/0097; B32B 27/36; B32B 27/065; B32B 27/18; B32B 2266/0264; B32B 2272/00; B32B 2307/736
See application file for complete search history.

(56) References Cited

FOREIGN PATENT DOCUMENTS

| | | | |
|---|---|---|---|
| CN | 115742517 | A | 3/2023 |
| CN | 116100898 | A | 5/2023 |
| CN | 116323413 | A | 6/2023 |
| KR | 101486799 | B1 | 1/2015 |
| WO | 2023032429 | A1 | 3/2023 |

OTHER PUBLICATIONS

International Search Report and Written Opinion issued in PCT/CN2024/120082; mailed Dec. 27, 2024; 13 pgs.

First Office Action issued in Chinese Patent Application No. 202311300538.X; mailed Nov. 24, 223; 17 pgs.

Second Office Action issued in Chinese Patent Application No. 202311300538.X; mailed Feb. 27, 2024, 17 pgs.

* cited by examiner

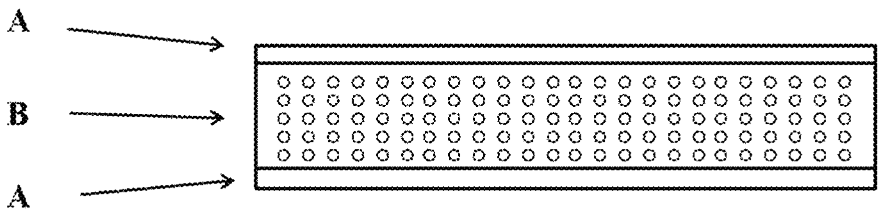
A
B
A

CRYSTALLINE AND EASILY RECYCLABLE POLYESTER HEAT SHRINKABLE FILM AND PREPARATION METHOD THEREOF

CROSS-REFERENCE TO RELATED APPLICATION

This disclosure is a Continuation Application of International Patent disclosure No. PCT/CN2024/120082, filed on Sep. 20, 2024, which claims the priority of Chinese patent application No. CN202311300538. X, named "CRYSTALLINE AND EASILY RECYCLABLE POLYESTER HEAT SHRINKABLE FILM AND PREPARATION METHOD THEREOF", filed in China National Intellectual Property Administration on Oct. 10, 2023. The disclosure of the two applications is incorporated by reference herein in their entireties.

TECHNICAL FIELD

The present disclosure relates to the field of heat shrinkable films preparation, in particular to a crystalline and easily recyclable polyester heat shrinkable film and a preparation method thereof.

BACKGROUND

Heat shrinkable film of Polyethylene terephthalate glycol copolymer (PETG) is one of the most widely used plastic products, and widely used in beverage packaging, daily chemical packaging and battery packaging. However, PETG is difficult to degrade, and can exist in the environment for hundreds of years in nature. Unreasonable treatment methods will have a serious impact on the environment. In order to alleviate the problem of plastic pollution and improve the recyclability of PETG film, the attention on recycling film products has been continuously improved.

However, there are many problems exist in the process of film recycling. Because the bottle chips are made of polyethylene terephthalate (PET), which has a high crystallinity and a high melting point, and labels with shrinkability (i.e., polyester film) are mostly amorphous PETG, the melting points and crystallinities of the two materials are quite different, and the densities of them are both greater than 1, such that it is difficult to separate the crushed bottle chips from the film. It is necessary to manually separate the polyester label from the bottle before the bottle is crushed, and then crush, classify and recycle the bottle, which increases the cost of manual sorting and affects the overall recycling efficiency. Moreover, the melting points of the two materials are different, and the melting point of PETG film is much lower than that of PET bottles. In the recycling process of PET, the materials need to be dried at a temperature higher than 200° C. At this temperature, a conventional polyester heat shrinkable film will soften and become sticky, which will form lumps with PET bottle chips, leading to adhesion and bridging in the recycling process, and thereby blocking the recycling equipment. These lumps must be treated before further processing. In addition, the lumps reduce the yield of the recycling process, and introduce additional processing steps of the lumps, which seriously affects the recycling of PET bottles.

At present, the reported recycling methods are mainly based on the molecular structure modification of PETG polyester, which improves the melting point and crystallinity of polyester raw materials, thus endowing the prepared polyester heat shrinkable film with crystallinity and making PETG tend to be in conformity with PET. However, this will lead to a decrease of the shrinkability of the prepared film, which can not meet the packaging requirements of various scenes, and the change of the synthesis process of the film is more complicated, while increasing energy consumption.

SUMMARY

In order to solve the problem existing in the existing recycling process and the problem of decrease in shrinkability of the crystallinie film, through improving the melting point of PETG films by modifying preparation and processing of the films, improving the shrinkage rate of the film by combining a porous structure combined with the process, and improving the crystallinity and melting point of the film by adding additives, the present disclosure provides a crystalline and easily recyclable polyester heat shrinkable film with good recyclability, crystallinity, printability, shrinkability and low shrinkage force, and a preparation method thereof.

Therefore, the present disclosure provides a crystalline and easily recyclable polyester heat shrinkable film, having a three-layer structure of layer A/layer B/layer C, wherein the layer A is prepared by raw materials consisting of polyethylene terephthalate glycol copolymer (PETG), functional master batch and polyethylene terephthalate (PET), the layer B is prepared by raw materials consisting of a modified PET, PET, a nucleating agent, a chain extender, and a foaming agent, the modified PET being a neopentyl glycol (NPG) modified PET.

In some embodiments, a mass percentage ratio of PETG, the functional batch, and PET in layer A is in a range of 89.4-66.0%:1.6-4.0%:10.0-30.0%, a mass percentage ratio of the modified PET, PET, the nucleating agent, the chain extender, and the foaming agent in layer B is in a range of 42-65.4%:30-40%:0.6-4.0%:2.0-6.0%:2.0-8.0%.

In some embodiments, the chain extender is at least one selected from the group consisting of glycidyl methacrylate and cyclohexyl acrylate.

In some embodiments, the nucleating agent is at least one selected from the group consisting of dibutyl sebacate, ammonium phosphate and sodium benzoate.

In some embodiments, the functional master batch consists of at least one selected from the group consisting of silicon dioxide, talcum powder, clay and kaolin, and at least one selected from the group consisting of oleamide and erucamide.

In some embodiments, the foaming agent is at least one selected from the group consisting of trihydrazine triazine, barium azodicarboxylate, 4,4'-oxobis(benzenesulfonyl semicarbazide) and p-toluenesulfonyl semicarbazide.

The present disclosure further provides a method for preparing the crystalline and easily recyclable polyester heat shrinkable film, comprising the following steps:

(1) separately mixing the raw materials of the layer A and the raw materials of the layer B to be uniform in a planetary mixer according to a proportion thereof, drying resulting mixtures, and then separately melting and plasticizing in corresponding extruders according to mixtures of a core layer and a surface layer;

(2) setting a three-layer structure of ABA, extruding resulting melts through a die at a temperature of 240-270° C., and cooling and stabilizing on a quenching roller, to obtain a casting sheet;

(3) stretching the casting sheet in longitudinal direction;

(4) stretching in transverse direction; and (5) traction winding to obtain the crystalline and easily recyclable polyester heat shrinkable film.

In some embodiments, the stretching in step (3) is performed by preheating the casting sheet at a temperature of 85-95° C., stretching at a temperature of 80-110° C. with a stretching ratio of 1-2 times in longitudinal direction, and then cooling and stabilizing at a temperature of 50-80° C.

In some embodiments, the stretching in step (4) is performed by preheating the casting sheet at a temperature of 90-110° C., stretching at a temperature of 80-95° C. with a stretching ratio of 4.0-5.5 times in transverse direction, and then cooling and stabilizing at a temperature of 70-90° C.

In some embodiments, the crystalline and easily recyclable polyester heat shrinkable film has a thickness of 30-100 μm.

Beneficial Effects

1. In the present disclosure, a foaming crystalline and easily recyclable polyester heat shrinkable film is prepared by adding a proper foaming agent into a core layer. In the processing process, a large stretching ratio could expand the pore structure in a certain extent, and the pore structure is fixed by stabilizing, and could shrink after heating, and thereby the film has a higher thermal shrinkage rate than ordinary crystalline films. The film structure of the present disclosure has a reduced density, such that it has a reduced binding force for the package in the film shrinkage process, and a reduced thermal shrinkage force, and could shrink in a mild way, which could solve the problems of of wrinkles caused by too fast shrinkage of the film and deformation of the packaging bottle caused by too large shrinkage force in the shrinkage process. Furthermore, the foaming agent could reduce the density of the film, such that more heat shrinkable film could be obtained from a certain amount of polyester chips, indicating a reduced cost.
2. By adding a chain extender into the core layer, the PETG component in the polyester film can be limited to cross-link, resulting in a polyester film with an increased molecular weight and an increased melting point, such that the melting point of the film approaches to that of PET on the premise of ensuring the thermal shrinkability of the polyester film. A suitable nucleating agent could accelerate the crystallization rate, increase the crystallization density, promote the formation of grains with fine size in the melting process, improve the crystallinity of the film to a certain extent, and avoid the loss of shrinkability due to excessive crystallization. The nucleating agent and chain extender synergetically improve the thermal deformation temperature of the film and the melting point of the material, so as to ensure that the film label prepared by this method could be recycled together with PET bottle chips, and blockage of the equipment caused by adhesion and bridging in the the recycling process is avoided. Furthermore, an appropriate proportion of the nucleating agent could control the size of the pore structure formed by the foaming agent in the melting process, and could effectively improve the fogging of the film caused by the pore structure and improve the luminous transmittance and light transmittance of the film. The recyclable crystalline film could be prepared without modifying the synthesis process of polyester chips, and also without increasing the cost of equipment modification and synthesis formula process modification. The film has a high shrinkage rate and strong product applicability.
3. The method of the present disclosure involves three additives for modification, a foaming agent, a chain extender and a nucleating agent, which have synergistic effect. Proper amount of the chain extender could increase the molecular weight (i.e., increase the melting point), and the nucleating agent could increase the crystallinity of the film, and they could synergistically improve the recyclability of the film, because the film prepared with the chain extender and nucleating agent does not stick to bottle chips and has no bridging effect in the reclycling process, thus having no adverse effect on the recycling rate. The foaming agent could improve film yield (by reducing density) and reduce shrinkage force of the film. However, excessive large pores formed by the foaming agent will affect the luminous transmittance of the film. While the nucleating agent could promote the formation of microcrystals, thus inhibiting the pores formed by foaming, and leading to an increased haze of the film.
4. The polyester film prepared in the present disclosure has a three-layer structure, in which the functional master batch added to the surface layer is mainly used to improve the printability and adhesivity of the film. The three layers are made of PET-derived materials with similar polarity, have strong adhesion and no delamination problem, and are the same kind of material, which is beneficial to recyclability of products.

BRIEF DESCRIPTION OF THE DRAWINGS

FIGURE is a schematic structural diagram of a crystalline and easily recyclable polyester heat shrinkable film prepared according to an embodiment of the present disclosure, wherein, layer A is a surface layer (printing layer) and layer B is a core layer (porous structure layer).

DETAILED DESCRIPTION OF THE EMBODIMENTS

In the following, the effects of the crystalline and easily recyclable polyester heat shrinkable film and the preparation method thereof of the present disclosure will be studied and analyzed through examples and comparative examples.

In the examples and comparative examples, PETG is selected from SKYGREEN® S2012 of SK Chemical Company of Korea and GN071 of Eastman Chemical Company. Modified PET (i.e., NPG modified PET) is selected from YH101 of Henan Yuanhong Polymer New Materials Co., Ltd., China and WS501 of Jiangyin Huahong Chemical Fiber Co., Ltd., China. PET is selected from FG600 of Sinopec Yizheng Chemical Fiber Co., Ltd., China and YH600 of Henan Yuanhong Polymer New Materials Co., Ltd., China.

Example 1

(1) Raw materials consisting of a modified PET (YH101 from Henan Yuanhong Polymer New Materials Co., Ltd., China), PETG (SKYGREEN® S2012 from SK Chemical Company of Korea), PET (FG600 from Sinopec Yizheng Chemical Fiber Co., Ltd., China) and a functional master batch, a nucleating agent, a chain extender and a foaming agent were dried in a vacuum dryer to remove water.

(2) Raw materials of each layer of the layer A/layer B/layer A three-layer structure were weighted according to corresponding ratio, and pre-mixed separately in a mixer, to obtain a raw material mixture of layer A and a raw material mixture of layer B, in which:

raw materials of the layer A consisted of the following components in percentage by mass:PETG:the functional master batch (an anti-adhesion agent $SiO_2$:a slipping agent erucamide=1:1):PET=76.8%:3.2%:20%, and raw materials of the layer B consisted of the following components in percentage by mass:the modified PET:PET:the nucleating agent (dibutyl sebacate:ammonium phosphate:sodium benzoate=1:1:4):the chain extender (glycidyl methacrylate):the foaming agent (barium azodicarboxylate:p-toluenesulfonyl semicarbazide=1:5)=57.0%:32.0%:2.5%:4.5%:4.0%.

(3) The raw material mixture of layer A and the raw material mixture of layer B were separately mixed to be uniform in a planetary mixer at a temperature of 60° C. for at least 1 h, and then separately put into twin-screw extruders for melting and plasticizing at a temperature of 245° C., wherein the twin-screw extruders had a screw diameter of 90 mm and a length-diameter ratio of 32.

(4) According to layer A/layer B/layer A structure, the raw material mixture of layer A and the raw material mixture of layer B were co-extruded from a die at a temperature of 247° C. using three extruders.

(5) A melt extruded from the die was cooled on a quenching roller to obtain a casting sheet, wherein a ratio of the rotational linear speed of the quenching roller to a melt outflow speed was less than or equal to 5, and the quenching roller had a temperature of 35±2° C.

(6) The casting sheet was stretched in longitudinal direction by single point stretching with infrared heating, and specifically performed by preheating the casting sheet at a temperature of 90° C., stretching in longitudinal direction for 1.5 times at a temperature of 95° C., and then cooling and stabilizing at a temperature of 60° C.

(7) The casting sheet obtained in step (6) was stretched in transverse direction with oil heating, and specifically performed by preheating the casting sheet at a temperature of 100° C., stretching in transverse direction for 5.0 times at 85° C., and then cooling and stabilizing at a temperature of 80° C.

(8) The casting sheet obtained in step (7) was subjected to traction winding, obtaining a crystalline and easily recyclable polyester heat shrinkable film with a thickness ratio of layer A, layer B, and layer A of 6:88:6.

Example 2

(1) Raw materials consisting of a modified PET (WS501 from Jiangyin Huahong Chemical Fiber Co., Ltd., China), PETG (GN071 from Eastman Chemical Company), PET (YH600 from Henan Yuanhong Polymer New Materials Co., Ltd., China) and a functional master batch, a nucleating agent, a chain extender and a foaming agent were dried in a vacuum dryer to remove water.

(2) Raw materials of each layer of the layer A/layer B/layer A three-layer structure were weighted according to corresponding ratio, and pre-mixed separately in a mixer, to obtain a raw material mixture of layer A and a raw material mixture of layer B, in which:

raw materials of the layer A consisted of the following components in percentage by mass:PETG:the functional master batch (an anti-adhesion agent $SiO_2$:a slipping agent erucamide=1:1):PET=76.8%:3.2%:20%, and raw materials of the layer B consisted of the following components in percentage by mass:the modified PET:PET:the nucleating agent (dibutyl sebacate:ammonium phosphate:sodium benzoate=1:1:4):the chain extender (glycidyl methacrylate):the foaming agent (barium azodicarboxylate:p-toluenesulfonyl semicarbazide=1:5)=49.0%:40.0%:1.0%:2.0%:8.0%.

(3) The raw material mixture of layer A and the raw material mixture of layer B were separately mixed to be uniform in a planetary mixer at a temperature of 60° C. for at least 1 h, and then separately put into twin-screw extruders for melting and plasticizing at a temperature of 255° C., wherein the twin-screw extruders had a screw diameter of 90 mm and a length-diameter ratio of 32.

(4) According to layer A/layer B/layer A structure, the raw material mixture of layer A and the raw material mixture of layer B were co-extruded from a die at a temperature of 257° C. using three extruders.

(5) A melt extruded from the die was cooled on a quenching roller to obtain a casting sheet, wherein a ratio of the rotational linear speed of the quenching roller to a melt outflow speed was less than or equal to 5, and the quenching roller had a temperature of 35±2° C.

(6) The casting sheet was stretched in longitudinal direction by single point stretching with infrared heating, and specifically performed by preheating the casting sheet at a temperature of 95° C., stretching in longitudinal direction for 1.5 times at a temperature of 85° C., and then cooling and stabilizing at a temperature of 60° C.

(7) The casting sheet obtained in step (6) was stretched in transverse direction with oil heating, and specifically performed by preheating the casting sheet at a temperature of 105° C., stretching in transverse direction for 5.5 times at a temperature of 80° C., and then cooling and stabilizing at a temperature of 80° C.

(8) The casting sheet obtained in step (7) was subjected to traction winding, obtaining a crystalline and easily recyclable polyester heat shrinkable film with a thickness ratio of layer A, layer B, and layer A of 6:88:6.

Example 3

(1) Raw materials consisting of a modified PET (YH101 from Henan Yuanhong Polymer New Materials Co., Ltd., China), PETG (SKYGREEN® S2012 from SK Chemical Company of Korea), PET (FG600 of Sinopec Yizheng Chemical Fiber Co., Ltd., China) and a functional master batch, a nucleating agent, a chain extender and a foaming agent were dried in a vacuum dryer to remove water.

(2) Raw materials of each layer of the layer A/layer B/layer A three-layer structure were weighted according to corresponding ratio, and pre-mixed separately in a mixer, to obtain a raw material mixture of layer A and a raw material mixture of layer B, in which:

raw materials of the layer A consisted of the following components in percentage by mass:PETG:the functional master batch (an anti-adhesion agent $SiO_2$:a slipping agent erucamide=1:1):PET=76.8%:3.2%: 20%, and raw materials of the layer B consisted of the following components in percentage by mass:the modified PET: PET:the nucleating agent (dibutyl sebacate:ammonium phosphate:sodium benzoate=1:1:4):the chain extender (glycidyl methacrylate):the foaming agent (barium azodicarboxylate:p-toluenesulfonyl semicarbazide=1: 5)=65.4%:22.6%:4.0%:6.0%:2.0%.

(3) The raw material mixture of layer A and the raw material mixture of layer B were separately mixed to be uniform in a planetary mixer at a temperature of 60° C. for at least 1 h, and then separately put into twin-screw extruders for melting and plasticizing at a temperature of 240° C., wherein the twin-screw extruders had a screw diameter of 90 mm and a length-diameter ratio of 32.

(4) According to layer A/layer B/layer A structure, the raw material mixture of layer A and the raw material mixture of layer B were co-extruded from a die at a temperature of 242° C. using three extruders.

(5) A melt extruded from the die was cooled on a quenching roller to obtain a casting sheet, wherein a ratio of the rotational linear speed of the quenching roller to a melt outflow speed was less than or equal to 5, and the quenching roller had a temperature of 35±2° C.

(6) The casting sheet was stretched in longitudinal direction by single point stretching with infrared heating, and specifically performed by preheating the casting sheet at a temperature of 90° C., stretching in longitudinal direction for 1.5 times at a temperature of 90° C., and then cooling and stabilizing at a temperature of 60° C.

(7) The casting sheet obtained in step (6) was stretched in transverse direction with oil heating, and specifically performed by preheating the casting sheet at a temperature of 90° C., stretching in transverse direction for 4.8 times at a temperature of 85° C., and then cooling and stabilizing at a temperature of 80° C.

(8) The casting sheet obtained in step (7) was subjected to traction winding, obtaining a crystalline and easily recyclable polyester heat shrinkable film with a thickness ratio of layer A, layer B, and layer A of 6:88:6.

Example 4

(1) Raw materials consisting of a modified PET (YH101 from Henan Yuanhong Polymer New Materials Co., Ltd., China), PETG (SKYGREEN® S2012 from SK Chemical Company of Korea), PET (FG600 of Sinopec Yizheng Chemical Fiber Co., Ltd., China) and a functional master batch, a nucleating agent, a chain extender and a foaming agent were dried in a vacuum dryer to remove water.

(2) Raw materials of each layer of the layer A/layer B/layer A three-layer structure were weighted according to corresponding ratio, and pre-mixed separately in a mixer, to obtain a raw material mixture of layer A and a raw material mixture of layer B, in which:

raw materials of the layer A consisted of the following components in percentage by mass:PETG:the functional master batch (an anti-adhesion agent $SiO_2$:a slipping agent erucamide=1:1):PET=87.2%:3.8%: 10%, and raw materials of the layer B consisted of the following components in percentage by mass:the modified PET: PET:the nucleating agent (dibutyl sebacate:ammonium phosphate:sodium benzoate=1:1:4):the chain extender (glycidyl methacrylate):the foaming agent (barium azodicarboxylate:p-toluenesulfonyl semicarbazide=1: 5)=57.0%:32.0%:2.5%:4.5%:4.0%.

(3) The raw material mixture of layer A and the raw material mixture of layer B were separately mixed to be uniform in a planetary mixer at a temperature of 60° C. for at least 1 h, and then separately put into twin-screw extruders for melting and plasticizing at a temperature of 245° C., wherein the twin-screw extruders had a screw diameter of 90 mm and a length-diameter ratio of 32.

(4) According to layer A/layer B/layer A structure, the raw material mixture of layer A and the raw material mixture of layer B were co-extruded from a die at a temperature of 247° C. using three extruders.

(5) A melt extruded from the die was cooled on a quenching roller to obtain a casting sheet, wherein a ratio of the rotational linear speed of the quenching roller to a melt outflow speed was less than or equal to 5, and the quenching roller had a temperature of 35±2° C.

(6) The casting sheet was stretched in longitudinal direction by single point stretching with infrared heating, and specifically performed by preheating the casting sheet at a temperature of 90° C., stretching in longitudinal direction for 1.5 times at a temperature of 95° C., and then cooling and stabilizing at a temperature of 60° C.

(7) The casting sheet obtained in step (6) was stretched in transverse direction with oil heating, and specifically performed by preheating the casting sheet at a temperature of 100° C., stretching in transverse direction for 5.0 times at 85° C., and then cooling and stabilizing at a temperature of 80° C.

(8) The casting sheet obtained in step (7) was subjected to traction winding, obtaining a crystalline and easily recyclable polyester heat shrinkable film with a thickness ratio of layer A, layer B, and layer A of 6:88:6.

Example 5

(1) Raw materials consisting of a modified PET (YH101 from Henan Yuanhong Polymer New Materials Co., Ltd., China), PETG (SKYGREEN® S2012 from SK Chemical Company of Korea), PET (FG600 of Sinopec Yizheng Chemical Fiber Co., Ltd., China) and a functional master batch, a nucleating agent, a chain extender and a foaming agent were dried in a vacuum dryer to remove water.

(2) Raw materials of each layer of the layer A/layer B/layer A three-layer structure were weighted according to corresponding ratio, and pre-mixed separately in a mixer, to obtain a raw material mixture of layer A and a raw material mixture of layer B, in which:

raw materials of the layer A consisted of the following components in percentage by mass:PETG:the functional master batch (an anti-adhesion agent $SiO_2$:a slipping agent erucamide=1:1):PET=66.0%:4.0%: 30.0%, and raw materials of the layer B consisted of the following components in percentage by mass:the modified PET: PET:the nucleating agent (dibutyl sebacate:ammonium phosphate:sodium benzoate=1:1:4):the chain extender (glycidyl methacrylate):the foaming agent (barium azodicarboxylate:p-toluenesulfonyl semicarbazide=1:5)=60.0%:28.5%:3.5%:5.0%:3.0%.

(3) The raw material mixture of layer A and the raw material mixture of layer B were separately mixed to be uniform in a planetary mixer at a temperature of 60° C. for at least 1 h, and then separately put into twin-screw extruders for melting and plasticizing at a temperature of 245° C., wherein the twin-screw extruders had a screw diameter of 90 mm and a length-diameter ratio of 32.

(4) According to layer A/layer B/layer A structure, the raw material mixture of layer A and the raw material mixture of layer B were co-extruded from a die at a temperature of 247° C. using three extruders.

(5) A melt extruded from the die was cooled on a quenching roller to obtain a casting sheet, wherein a ratio of the rotational linear speed of the quenching roller to a melt outflow speed was less than or equal to 5, and the quenching roller had a temperature of 35±2° C.

(6) The casting sheet was stretched in longitudinal direction by single point stretching with infrared heating, and specifically performed by preheating the casting sheet at a temperature of 90° C., stretching in longitudinal direction for 1.5 times at a temperature of 95° C., and then cooling and stabilizing at a temperature of 60° C.

(7) The casting sheet obtained in step (6) was stretched in transverse direction with oil heating, and specifically performed by preheating the casting sheet at a temperature of 100° C., stretching in transverse direction for 5.0 times at 85° C., and then cooling and stabilizing at a temperature of 80° C.

(8) The casting sheet obtained in step (7) was subjected to traction winding, obtaining a crystalline and easily recyclable polyester heat shrinkable film with a thickness ratio of layer A, layer B, and layer A of 6:88:6.

Comparative Example 1

In this comparative example, a heat shrinkable film was prepared using the method of Example 1, except that raw materials of the core layer (layer B) consisted of the following components in percentage by mass:a modified PET (YH101 from Henan Yuanhong Polymer New Materials Co., Ltd., China):a nucleating agent (dibutyl sebacate:ammonium phosphate:sodium benzoate=1:1:4):a chain extender (glycidyl methacrylate):a foaming agent (barium azodicarboxylate:p-toluenesulfonyl semicarbazide=1:5)=89.0%:2.5%:4.5%:4.0%.

Comparative Example 2

In this comparative example, a heat shrinkable film was prepared using the method of Example 1, except that raw materials of the core layer (layer B) consisted of the following components in percentage by mass:PET (FG600 from Sinopec Yizheng Chemical Fiber Co., Ltd., China):a nucleating agent (dibutyl sebacate:ammonium phosphate:sodium benzoate=1:1:4):a chain extender (glycidyl methacrylate):a foaming agent (barium azodicarboxylate:p-toluenesulfonyl semicarbazide=1:5)=89.0%:2.5%:4.5%:4.0%.

Comparative Example 3

In this comparative example, a heat shrinkable film was prepared using the method of Example 1, except that raw materials of the core layer (layer B) consisted of the following components in percentage by mass:a modified PET (YH101 from Henan Yuanhong Polymer New Materials Co., Ltd., China):PET (FG600 from Sinopec Yizheng Chemical Fiber Co., Ltd., China):a chain extender (glycidyl methacrylate):a foaming agent (barium azodicarboxylate:p-toluenesulfonyl semicarbazid=1:5)=59.5%:32.0%:4.5%:4.0%.

Comparative Example 4

In this comparative example, a heat shrinkable film was prepared using the method of Example 1, except that raw materials of the core layer (layer B) consisted of the following components in percentage by mass:a modified PET (YH101 from Henan Yuanhong Polymer New Materials Co., Ltd., China):PET (FG600 from Sinopec Yizheng Chemical Fiber Co., Ltd., China):a nucleating agent (dibutyl sebacate:ammonium phosphate:sodium benzoate=1:1:4):a foaming agent (barium azodicarboxylate:p-toluenesulfonyl semicarbazide=1:5)=61.5%:32.0%:2.5%:4.0%.

Comparative Example 5

In this comparative example, a heat shrinkable film was prepared using the method of Example 1, except that raw materials of the core layer (layer B) consisted of the following components in percentage by mass:a modified PET (YH101 from Henan Yuanhong Polymer New Materials Co., Ltd., China):PET (FG600 from Sinopec Yizheng Chemical Fiber Co., Ltd., China):a nucleating agent (dibutyl sebacate:ammonium phosphate:sodium benzoate=1:1:4):a chain extender (glycidyl methacrylate)=61.0%:32.0%:2.5%:4.5%.

Comparative Example 6

In this comparative example, a heat shrinkable film was prepared using the method of Example 1, except that raw materials of the core layer (layer B) consisted of the following components in percentage by mass:a modified PET (YH101 from Henan Yuanhong Polymer New Materials Co., Ltd., China):PET (FG600 from Sinopec Yizheng Chemical Fiber Co., Ltd., China):a foaming agent (barium azodicarboxylate:p-toluenesulfonyl semicarbazide=1:5)=64.0%:32.0%:4.0%.

Comparative Example 7

In this comparative example, a heat shrinkable film was prepared using the method of Example 1, except that raw materials of the core layer (layer B) consisted of the following components in percentage by mass:a modified PET (YH101 from Henan Yuanhong Polymer New Materials Co., Ltd., China):PET (FG600 from Sinopec Yizheng Chemical Fiber Co., Ltd., China):a nucleating agent (dibutyl sebacate:ammonium phosphate:sodium benzoate=1:1:4):a chain extender (glycidyl methacrylate):a foaming agent (barium azodicarboxylate:p-toluenesulfonyl semicarbazide=1:5)=53.0%:28.5%:10.0%:4.5%:4.0%.

Comparative Example 8

In this comparative example, a heat shrinkable film was prepared using the method of Example 1, except that raw materials of the core layer (layer B) consisted of the following components in percentage by mass:a modified PET (YH101 from Henan Yuanhong Polymer New Materials Co., Ltd., China):PET (FG600 from Sinopec Yizheng Chemical Fiber Co., Ltd., China):a nucleating agent (dibutyl sebacate: ammonium phosphate:sodium benzoate=1:1:4):a chain extender (glycidyl methacrylate):a foaming agent (barium azodicarboxylate:p-toluenesulfonyl semicarbazide= 1:5)=53.0%:28.5%:2.5%:12.0%:4.0%.

Comparative Example 9

In this comparative example, a heat shrinkable film was prepared using the method of Example 1, except that the surface layer (layer A) consisted of the following components in percentage by mass:PETG (SKYGREEN® S2012 from SK Chemical Company of Korea):a functional master batch (an anti-blocking agent $SiO_2$:a slipping agent erucamide=1:1)=97.8%:3.2%.

Comparative Example 10

In this comparative example, a heat shrinkable film was prepared using the method of Example 1, except that the surface layer (layer A) consisted of the following components in percentage by mass:PETG (SKYGREEN® S2012): PET (FG600 from Sinopec Yizheng Chemical Fiber Co., Ltd., China)=76.8%:23.2%.

Comparative Example 11

In this comparative example, a heat shrinkable film was prepared using the method of Example 1, except that the stretching ratio of the casting sheet in transverse direction was changed to 4.0 times.

Comparative Example 12

In this comparative example, a heat shrinkable film was prepared using the method of Example 1, except that the stretching ratio of the casting sheet in longitudinal direction was changed to 1.0 time.

The thickness, melting point, lump test, shrinkage rate, shrinkage force, haze, luminous transmittance and wetting tension of the high-melting-point and easily recyclable PETG heat shrinkable film prepared according to Examples 1-5 and Comparative Examples 1-10 were tested respectively, in which the luminous transmittance and haze were tested according to GB/T 2410-2008, the wetting tension was tested according to GB/T 14216-2008/1SO 8296:2003, the lump test were performed with reference to APR PET CG-02 Critical Guidance, and specifically as follows: shrunk broken film chips are dried in an oven at a temperature of 160° C. for 0.5 h, and the dried broken film chips are evenly mixed with the bottle chips in a mass ratio of 1:3, and then baked in an oven at a temperature of 210° C. for 90 min, and then taken out. If the mass percentage of the lumps, resulting from sticking of film chips and bottle chips, does not exceed 1% of the total mass of the mixture, it is considered as passing, otherwise it is considered as not passing. The results are shown in Table 1.

TABLE 1

Crystalline and easily recyclable PETG heat shrinkable film

| Test item | Actual thickness (μm) | Thermal shrinkage rate (%) (90° C./10 second) Longitudinal direction | Transverse direction | Melting point (° C.) | Lump test | Haze (%) | Luminous transmittance (%) | Shrinkage force (N) | Wetting tension (mN/m) |
|---|---|---|---|---|---|---|---|---|---|
| Example 1 | 40 | 5 | 76 | 231 | √ | 3.76 | 98.3 | 5.7 | 40 |
| Example 2 | 40 | 3 | 74 | 233 | √ | 3.91 | 98.3 | 5.3 | 40 |
| Example 3 | 40 | 5 | 78 | 231 | √ | 3.55 | 98.5 | 5.8 | 40 |
| Example 4 | 40 | 5 | 77 | 231 | √ | 3.68 | 98.3 | 5.7 | 40 |
| Example 5 | 40 | 4 | 76 | 232 | √ | 3.57 | 98.4 | 5.6 | 40 |
| Comparative example 1 | 40 | 11 | 79 | 193 | x | 3.37 | 98.7 | 4.9 | 40 |
| Comparative example 2 | 40 | 0 | 0.5 | 255 | √ | 38.7 | 50.6 | 0 | 40 |
| Comparative example 3 | 40 | 6 | 77 | 210 | x | 17.5 | 68.5 | 6.3 | 40 |
| Comparative example 4 | 40 | 8 | 77 | 197 | x | 3.87 | 98.2 | 6.1 | 40 |
| Comparative example 5 | 40 | 4 | 65 | 243 | √ | 2.94 | 99.0 | 9.3 | 40 |
| Comparative example 6 | 40 | 7 | 79 | 191 | x | 87.2 | 60.1 | 6.5 | 40 |
| Comparative example 7 | 40 | 0 | 49 | 249 | √ | 8.21 | 81.0 | 2.3 | 40 |
| Comparative example 8 | / | / | / | / | / | / | / | / | / |
| Comparative example 9 | 40 | 6 | 76 | 221 | x | 3.55 | 98.4 | 5.8 | 40 |

TABLE 1-continued

| Crystalline and easily recyclable PETG heat shrinkable film | | | | | | | | | |
|---|---|---|---|---|---|---|---|---|---|
| Test item | Actual thick-ness (μm) | Thermal shrinkage rate (%) (90° C./10 second) Longitudinal direction | Trans-verse direction | Melting point (° C.) | Lump test | Haze (%) | Luminous trans-mittance (%) | Shrink-age force (N) | Wetting tension (mN/m) |
| Com-parative example 10 | 40 | 5 | 76 | 232 | √ | 3.47 | 98.1 | 5.5 | 38 |
| Com-parative example 11 | 40 | 4 | 68 | 230 | √ | 3.78 | 98.5 | 5.1 | 40 |
| Com-parative example 12 | 40 | −2 | 77 | 236 | √ | 3.62 | 98.3 | 5.6 | 40 |

As can be seen from Table 1, from comparison of Examples 1-4 and Comparative Example 1, it can be seen that when the core layer consists excessive modified PET, the shrinkage rate of the film is improved, but insufficient PET content in the film will lead to a low melting point of the film, resulting a failure of the lump test and adversely affecting the recycling process.

From comparison of Example 1 and Comparative Example 2, it can be seen that when the core layer contains no modified PET, the main component of the core layer is PET, and the film almost loses its shrinkability, and the optical properties of the film decreases significantly.

From the comparison of Example 1, Comparative Example 3, Comparative Example 4 and Comparative Example 6, it can be seen that when the core layer contains no nucleating agent, the pore structure resulted from the foaming agent is uncontrollable, the haze of the film is obviously improved, and the crystallinity of the film is reduced without the nucleating agent, leading to a failure of the lump test and recycling. When the core layer contains no chain extender, the molecular weight and viscosity of the film cannot be improved, resulting in a low melting point of the film and a failure of the lump test. When the core layer contains no nucleating agent and no chain extender, the film has an unqualified crystallinity, a low melting point, a large haze, and could not pass the lump test, and the haze is large, thereby being unrecyclable.

From comparison of Example 1 and Comparative Example 5, it can be seen that when the core layer contains no foaming agent, the film has no pore structure, and thus there is no pore expansion during stretching, and the film could not shrink after preheating, and the film has a low shrinkage rate due to the certain crystallinity of the film. Due to no foaming agent, the film has a large density, and a correspondingly large shrinkage force. In an application process, the excessive fast shrinkage may lead to bottle deformation or shrinkage wrinkle, thereby limiting the application of the film.

From comparison of Example 1 and Comparative Example 7, it can be seen that when the core layer contains an excessive nucleating agent, the crystallization velocity of the film is too fast, which leads to an excessive crystallinity of the film, an obvious increase in the haze of the film, and a significant decrease in the thermal shrinkability of the film, thus seriously and adversely affecting the packaging effect. Moreover, since the excessive nucleating agent results in a high crystallinity and a high crystallizaiton velocity, which limits the expansion of pores formed by the foaming agent, and affects the improvement of thermal shrinkability of the film by pores.

From comparison of Example 1 and Comparative Example 8, it can be seen that when the core layer contains an excessive chain extender, the polymer has a high cross-linking degree in the process of melting and extrusion, and the film has a significantly reduced extensibility in the preparation process, resulting in a failure of stretching.

From comparison of Example 1 and Comparative Example 9, when the surface layer contains no PET, the film has a reduced melting point and a reduced crystallinity, which leads to a failure of the lump test, and resulting in clumps caused by stickiness in a recycling process.

From comparison of Example 1 and Comparative Example 10, it can be seen that when the surface layer contains no functional master batch, the film has an excessive surface friction, resulting in problems such as unsmooth winding, poor surface tension of the film, unqualified wetting tension, and unprintability of the film in later process.

From comparison of Example 1 and Comparative Examples 11 and 12, when the stretching in transverse direction in the preparation is performed insufficiently, the resulting film has a low shrinkage rate, which makes the film unable to be applied to scenes requiring a high shrinkage rate. When the preparation does not involve stretching in longitudinal direction, due to the characteristics of the raw materials, the casting sheet is elongated after preheating and shrinking in stretching longitudinal direction, which adversely affects the packaging effect of the terminal.

The above examples are only exemplary illustrations of the present disclosure, and do not intend to limit the scope of the present disclosure. It should be noted that the illustrations of these embodiments are intended to assist those skilled in the art to understand the present disclosure, but do not intend to limit the present disclosure. In addition, the technical features involved in each embodiment of the present disclosure described above can be combined with each other as long as they do not conflict with each other. In addition, the above examples are only part of the examples of the present disclosure, but not all of them. Based on the examples in the present disclosure, all other examples obtained by a person ordinary skilled in the art without creative work belong to the scope of the present disclosure.

What is claimed is:

1. A crystalline and easily recyclable polyester heat shrinkable film, having a three-layer porous structure of layer A/layer B/layer A, wherein;

the layer A is prepared by raw materials consisting of polyethylene terephthalate glycol copolymer (PETG), a functional master batch and polyethylene terephthalate (PET), the layer B is prepared by raw materials consisting of a modified PET, PET, a nucleating agent, a chain extender, and a foaming agent, the modified PET being a neopentyl glycol (NPG) modified PET;

a mass percentage ratio of PETG, the functional batch, and PET in layer A is in a range of 89.4-66.0%: 1.6-4.0%: 10.0-30.0%, a mass percentage ratio of the modified PET, PET, the nucleating agent, the chain extender, and the foaming agent in layer B is in a range of 42-65.4%: 30-40%: 0.6-4.0%: 2.0-6.0%: 2.0-8.0%;

the functional master batch consisting of at least one first element selected from the group consisting of silicon dioxide, talcum powder, clay and kaolin, and at least one second element selected from the group consisting of oleamide and erucamide;

the nucleating agent consists of dibutyl sebacate, ammonium phosphate and sodium benzoate in a ratio of 1:1:4;

the chain extender is glycidyl methacrylate; and the foaming agent consists of barium azodicarboxylate and p-toluenesulfonyl semicarbazide in a ratio of 1:5.

2. A method for preparing the crystalline and easily recyclable polyester heat shrinkable film of claim 1, comprising the following steps:

(1) separately mixing the raw materials of the layer A and the raw materials of the layer B to be uniform in a planetary mixer according to a proportion thereof, drying resulting mixtures, and then separately melting and plasticizing in corresponding extruders according to mixtures of a core layer and a surface layer;

(2) setting a three-layer structure of ABA, extruding resulting melts through a die at a temperature of 240-270° C., and then cooling and stabilizing on a quenching roller, to obtain a casting sheet;

(3) stretching the casting sheet in longitudinal direction;

(4) stretching in transverse direction; and (5) traction winding to obtain the crystalline and easily recyclable polyester heat shrinkable film.

3. The method of claim 2, wherein the stretching in step (3) is performed by preheating the casting sheet at a temperature of 85-95° C., stretching at a temperature of 80-110° C. with a stretching ratio of 1-2 times in longitudinal direction, and then cooling and stabilizing at a temperature of 50-80° C.

4. The method of claim 3, wherein the stretching in step (4) is performed by preheating the casting sheet at a temperature of 90-110° C., stretching at a temperature of 80-95° C. with a stretching ratio of 4.0-5.5 times in transverse direction, and then cooling and stabilizing at a temperature of 70-90° C.

5. The method of claim 4, wherein the crystalline and easily recyclable polyester heat shrinkable film has a thickness of 30-100 μm.

* * * * *